United States Patent
Lee et al.

(10) Patent No.: US 9,346,196 B2
(45) Date of Patent: May 24, 2016

(54) METHOD FOR MANUFACTURING FLEXIBLE SUBSTRATE WITH SURFACE STRUCTURE COPYING FROM A TEMPLATE

(75) Inventors: Si-Chen Lee, Taipei (TW); Chieh-Hung Yang, Taipei (TW); Chun-Yuan Hsueh, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 977 days.

(21) Appl. No.: 13/481,857

(22) Filed: May 27, 2012

(65) Prior Publication Data

US 2013/0034698 A1 Feb. 7, 2013

(30) Foreign Application Priority Data

Aug. 5, 2011 (TW) .............................. 100127988 A (51) Int. Cl.
*B29C 41/00* (2006.01)
*B29C 41/36* (2006.01)
*B29C 33/42* (2006.01)
*B29C 41/38* (2006.01)

(52) U.S. Cl.
CPC ............... *B29C 41/36* (2013.01); *B29C 33/424* (2013.01); *B29C 41/38* (2013.01); *Y10T 428/24479* (2015.01)

(58) Field of Classification Search
CPC ........ B29C 59/00; B29C 59/005; B29C 59/02
USPC .......................................... 264/337, 338, 293
See application file for complete search history.

(56) References Cited

U.S. PATENT DOCUMENTS

| 7,743,492 | B2 * | 6/2010 | Kerr | .................... | H05K 3/0014 164/2 |
| 2009/0147405 | A1 * | 6/2009 | Oshima | .................. | G11B 5/855 360/244 |

* cited by examiner

*Primary Examiner* — Christina Johnson
*Assistant Examiner* — Xue Liu
(74) *Attorney, Agent, or Firm* — Li & Cai Intellectual Property (USA) Office (57) ABSTRACT

Disclosed herein are a flexible substrate with surface structure and a method for manufacturing the flexible substrate. The disclosure relates to a low-cost process to manufacturing the flexible substrate that is adapted to the large-area mass production. According to one of the embodiments in the disclosure, the method introduces a mold with surface structure. An isolation material is formed on the mold surface in an earlier stage. Upon the isolation layer, a flexible substrate material is coated. After that, a baking step is employed to cure the flexible substrate material. The flexible substrate with surface structure is therefore formed after de-molding the cured substrate. Another aspect to the disclosure adopts the above-formed substrate to be a base substrate. A second flexible substrate with the surface structure identical to the mold is then formed by performing the above steps.

17 Claims, 7 Drawing Sheets

METHOD FOR MANUFACTURING FLEXIBLE SUBSTRATE WITH SURFACE STRUCTURE COPYING FROM A TEMPLATE

BACKGROUND OF THE INVENTION

1. Field of the Invention

An instant disclosure is related to a method for manufacturing a flexible substrate with surface structure, and a method for copying from a template structure on another, in particular, a transfer process is introduced to manufacture the flexible substrate using a molding plate with surface structure.

2. Description of Related Art

Production of surface micro-structure has been widely used in various technological fields. For instance, the surface structure may be produced to manufacture the infrared emitter, enhance the light emitting efficiency of light-emitting diode (LED), or improve the conversion efficiency for solar cell. In general, the surface micro-structure is applied to the rigid substrates such as semiconductor substrate and glass substrate, however, the flexible electronic device has advantages to achieve cheaper, flexible, and lightweight products.

In the current technologies, several manufacturing processes are required to fabricate various size of structure on the surface. For example, thin film deposition, high-temperature annealing, reactive ion etching, and photo-lithography. However, those processes are complex, time-consuming, and some of the manufacturing systems are very expensive.

In addition, the manufacture of the micro-structure upon the flexible substrate is restricted by the substrate material, including organic and polymeric. Generally, the high-temperature manufacturing process or the process with acid or alkali condition will damage the organic or polymeric substrate.

SUMMARY OF THE INVENTION

The method for manufacturing the flexible substrate with surface structure in accordance with the invention is disclosed. The method employs a molding plate with surface structure, and then a transfer method is used to copy the surface structure onto the surface of the flexible substrate. This scheme prevents the flexible material from any damage made by the conventional process. Also, the surface structure of the flexible substrate could be configured to achieve mass production with various shapes, sizes, periodic or non-periodic patterns with low cost process.

Furthermore, the mentioned transfer process is incorporated to coating the flexible material upon the surface structure of the molding plate. The transfer process allows the procedure to have no limit about size. In particular, the molding plate is reusable even after the transfer process.

One of the objectives of the present invention is to perform a simple process of transfer the surface structure onto the flexible material. The transfer process is able to have mass production since it provides an uncomplicated process for application to the substrate with various areas and sizes.

In accordance with one of the embodiments of the present invention, an isolation material is introduced for the process to allowing the flexible material easily peeled from the molding plate. The isolation material is even adapted to more comprehensive applications.

In accordance with one further embodiment, the manufacturing method for the flexible substrate with micro-structure includes preparing a molding plate with surface structure, and then forming an isolation layer on the molding plate. Next, a flexible substrate material is coated on the isolation layer, and then is cured by a baking process. Finally, the flexible substrate with micro-structure is completed after a de-molding step.

One further embodiment of the present invention is to form the surface structure which has the same morphology of the molding plate. For implementing the specified surface structure identical to the molding plate, the flexible substrate with micro-structure mentioned above is utilized since it has the complementary structure compared to the molding plate. In the process, this flexible substrate is firstly adhered to one hard substrate, and an isolation layer is again formed on the flexible substrate. Then, another flexible substrate material is coated on the surface of the isolation layer. After curing and de-molding steps, the second flexible substrate with micro-structure identical to the molding plate is formed.

According to the embodiment of the present invention, if the molding plate is made of a silica-based material, the isolation layer could be skipped in the process. In the meantime, the flexible substrate material can be directly coated on the molding plate. The material is then cured and can be de-molded from the molding plate. The flexible substrate with micro-structure is substantially formed.

BRIEF DESCRIPTION OF THE DRAWINGS

FIG. 2 (A)(B) schematically show a molding plate and product with surface structure in accordance with the present invention;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The flexible substrate with a specified surface structure and its manufacturing method in accordance with the invention are herein disclosed. One of the objectives of the method is to copy the surface micro-structure of a molding plate onto a flexible substrate. In particular, a transfer process is introduced to implementing the coping process. The material property of the substrate is especially under consideration during the transfer process. In an exemplary embodiment, an isolation layer may be introduced to being coated on the plate surface. The isolation layer may preclude the flexible material from the damage during the peeling step. Therefore, the configuration of the layers allows the flexible substrate to have the various shapes, sizes, periodic or non-periodic patterns onto the surface, and also achieves the low-cost and mass productions.

Figure 1:
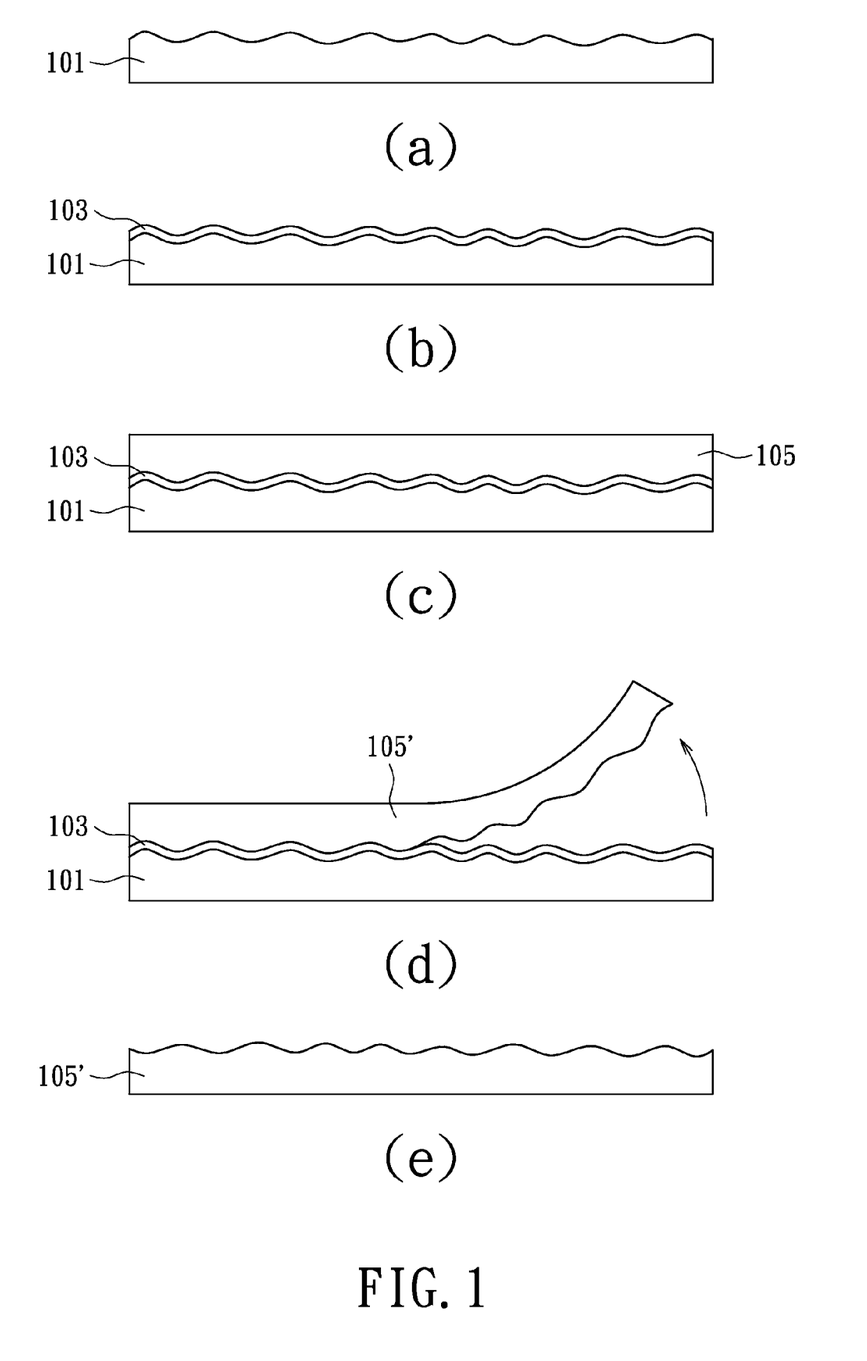
FIG. 1 (a)(b)(c)(d)(e) illustrates one of the embodiments of manufacturing process for the flexible substrate with micro-structure in accordance with the present invention.

The method for manufacturing the flexible substrate with surface structure is schematically described in the flow charts shown in FIG. 1 (a)(b)(c)(d)(e).

In the exemplary example, a beginning step of the process of the method is to prepare a molding plate with surface structure. FIG. 1(a) shows the molding plate 101, which is made with a specified surface structure based on the practical demand. The molding plate shall be with certain rigidity, such as the metal, glass, or semiconductor material. The rigid plate is reusable since it is applicable to one or more times the transfer process. One of the objectives of the invention is to apply the molding plate for making a duplicate surface structure onto the transparent flexible substrate.

Next step is referred to FIG. 1(b). An isolation layer is formed upon the surface of the molding plate. For example, an isolation material 103 formed on the plate 101 is made by a coating process, a depositing process (such as CBD), or a plating process. The isolation layer is used for isolating the molding plate from the above materials. Main composition of the isolation layer is silicide, such as silicon oxide ($SiO_x$) and silicon nitride ($SiN_x$). The use of silicide is to make a better combination of the coating material and the molding plate 101, therefore a moderate adhesive force is under consideration to select the material. In one further embodiment, if the molding plate is a kind of silicon substrate, the isolation layer could be directly formed under a thermal oxidation process, such as a wet oxidation or dry oxidation process.

After the isolation layer is formed, such as shown in FIG. 1(c), a flexible substrate material 105 is coated upon the isolation material 103. The flexible substrate material 105 is essentially made of polyimide (PI). The polyimide-based material is such as organic polyimide, or preferably a mixture of organic polyimide and inorganic silicon oxide. The implementation for the material of flexible substrate is not limited to the fabrication shown in the above description.

The adhesive force between the molding plate and the flexible substrate material 105 is required to be uniform even though the adhesive force may be variant between the two layers. Otherwise the flexible substrate may be hard to be peeled off due to the strong adhesive force. On the contrary, the too weak adhesive force may not cause completely duplicate surface structure from the molding plate. The mentioned isolation layer is therefore necessarily introduced to harmonize the adhesive force between the molding plate 101 and the flexible substrate material 105.

Next, a curing step is selectively performed upon the flexible substrate material 105. The flexible substrate material 105 may be solidified by this curing step. A heating process may be used to implement the curing process. The cured flexible substrate material 105 forming a flexible substrate product 105' may have a certain level of rigidity and flexibility.

Further reference is made to FIG. 1(d). The flexible substrate product 105' is de-molded from the plate. The surface of the end item forms a structure complementary to the original surface structure of the molding plate 101 shown in FIG. 1(e).

The flexible substrate formed from the manufacturing method in accordance with the present invention is applicable as a solar cell substrate. The light absorption of solar cell can be dramatically increased. The use of the claimed flexible substrate may not be limited to the current embodiment but to any need.

If the surface structure of the molding plate for the fabrication of the flexible substrate has periodic textures, the structure may be adapted to the substrate of an infrared emitter device. Since the micro-structure on the flexible substrate of the invention is preferably made by the transfer process, the fabrication may not need to repeat the prior complicated manufacturing steps. It is featured that the molding plate is reusable and applicable to make mass production with low cost process. The transfer process is therefore adapted to the fabrication of large-area substrate. Furthermore, this manufacturing method is also easily combined with the current process.

Figure 2A:
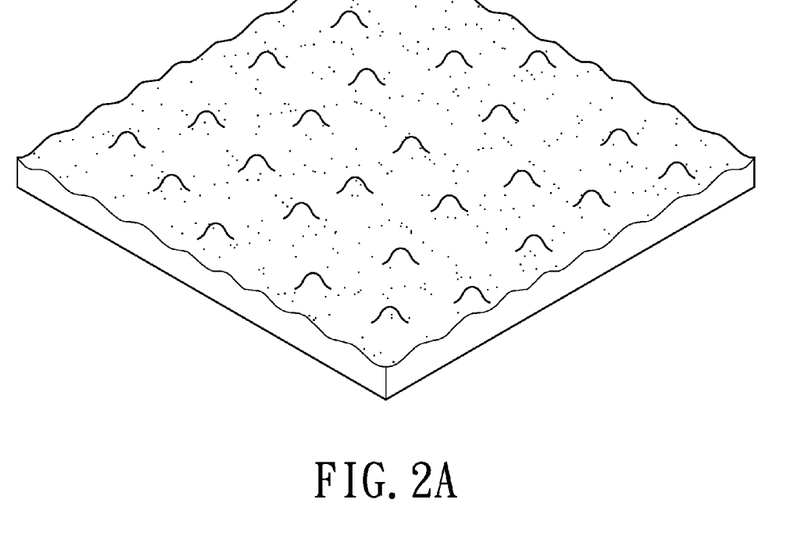
Figure 2B:
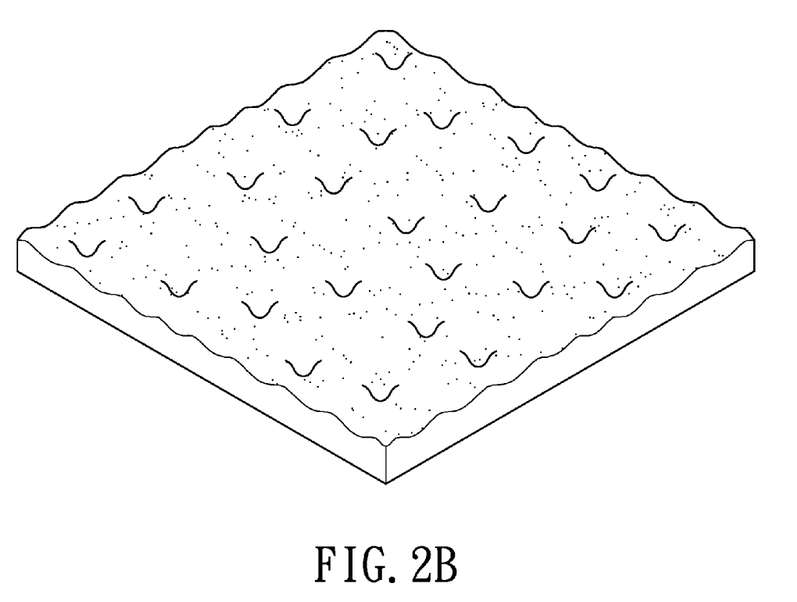

In the manufacturing process, the flexible substrate material is nicely coated on the surface of the molding plate, by which the surface structure of the plate is able to be copied to the surface of the flexible substrate. Reference is made to FIG. 2(A) describing the molding plate used to manufacture the flexible substrate. The surface of the molding plate is installed with a specific micro-structure. The flexible substrate product made by the process is shown as FIG. 2(B), where the substrate has the size corresponding to the molding plate and complementary shape to the molding plate.

Figure 3:
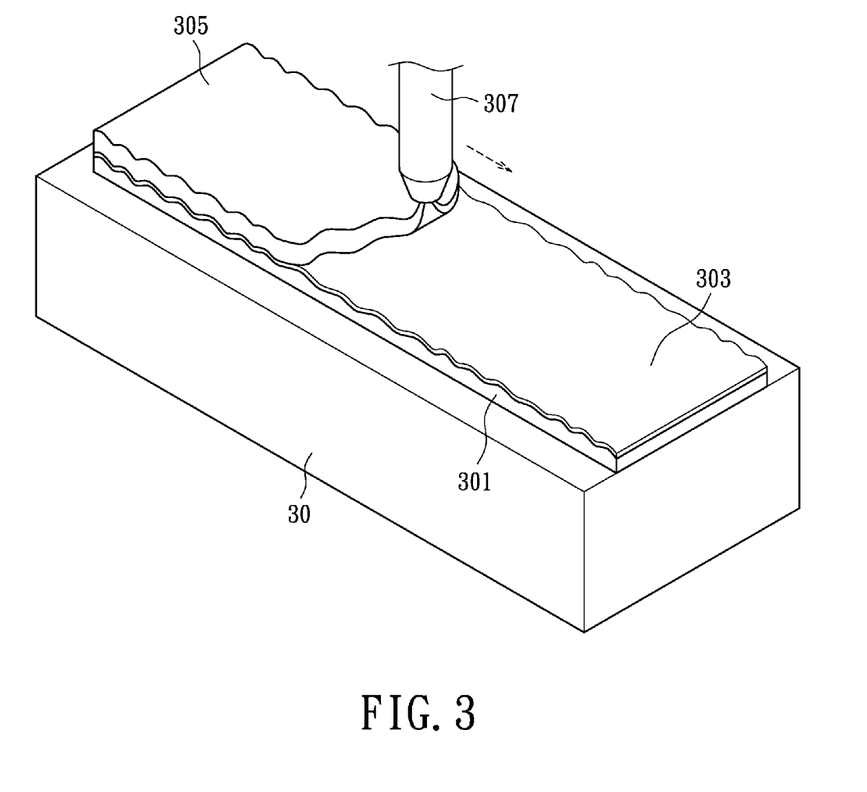
FIG. 3 is a schematic diagram showing one embodiment of a molding process for the flexible substrate with surface structure in accordance with the present invention.

FIG. 3 is a schematic diagram showing one of the embodiments of the manufacturing process made to form the flexible substrate with the surface structure in accordance with the present invention.

Figure 6:
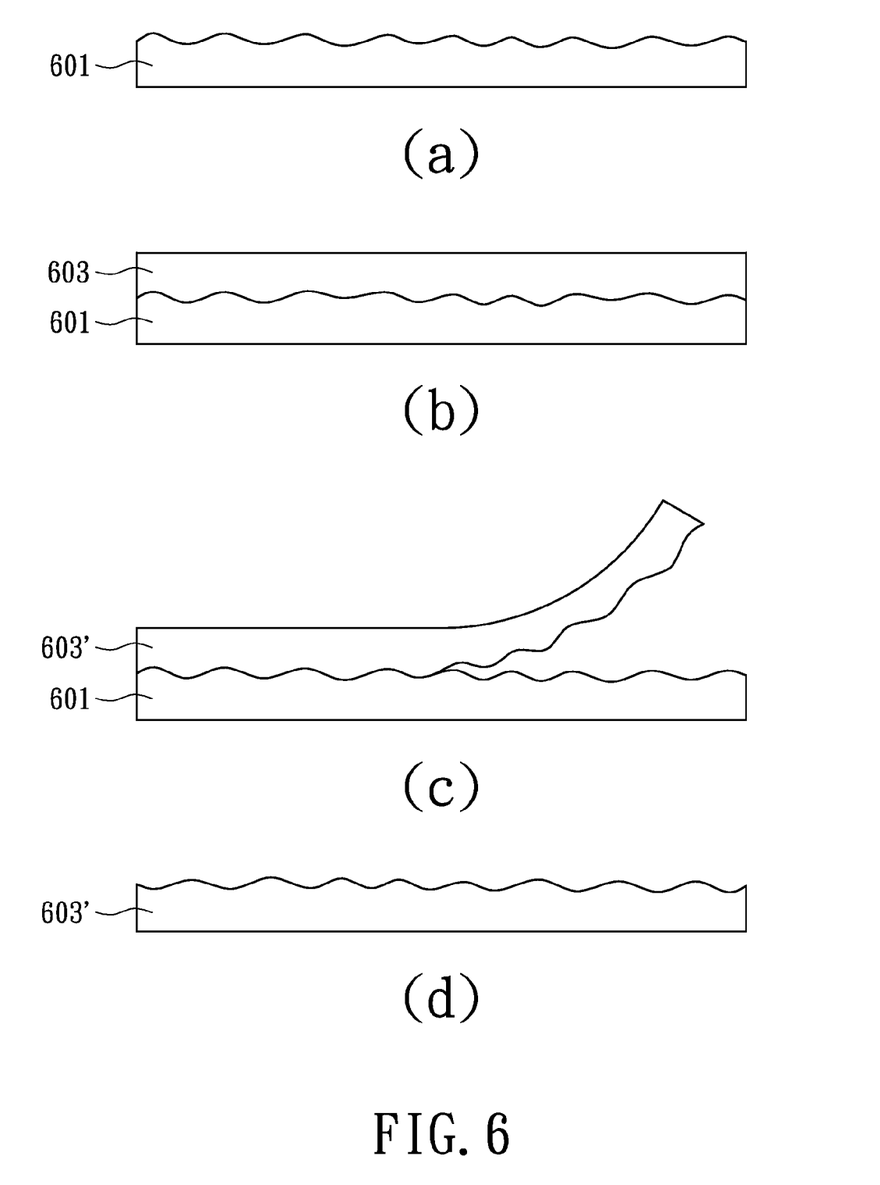
FIG. 6 (a)(b)(c)(d) illustrates another one of the embodiments of the manufacturing method for the flexible substrate with micro-structure in accordance with the present invention.

A machine bench 30 is prepared with a molding plate 301 thereon. The surface of the molding plate 301 has a specific surface structure. An isolation material 303 is prepared upon the molding plate 301. Exemplarily, the isolation material 303 may be formed thereon by coating, depositing process, or plating process. The isolation material 303 and the molding plate 301 form a base structure upon the machine bench 30. One further embodiment shown in FIG. 6 is to ignore the process of forming the isolation layer since the molding plate 301 is primarily made by silicide.

Next, an injecting apparatus 307 is prepared to coat the gel-type flexible substrate material 305 onto the base structure of the molding plate 301 and the isolation material 303. In one further embodiment, a suitable external pressure is optionally applied to completely match up the flexible substrate material 305 and the base structure.

According to the description of the current embodiment and in view of the process described in FIG. 1, a pressing process is particularly introduced to the final step. In which, after the flexible substrate material is coated upon the base structure (FIG. 1(c)), the pressing process is used to compact the flexible substrate material (105), the isolation material (103), and the molding plate (101) with surface structure.

Figure 4:
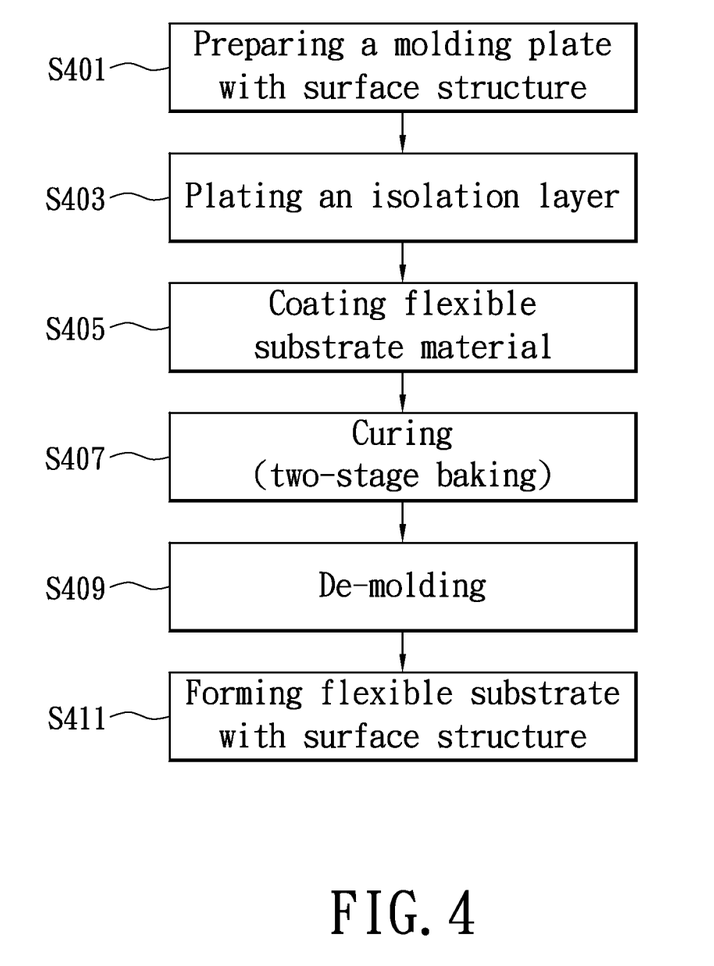
FIG. 4 is a flow chart illustrating a method for manufacturing the flexible substrate with micro-structure in accordance with one embodiment of the present invention.

The method for manufacturing the flexible substrate with surface structure may be referred to the flow chart of FIG. 4.

Begin with the step S401 for preparing the molding plate with surface structure. The material thereof is based on glasses, metals or semiconductors.

Next, such as step S403, a depositing, coating, or plating process may be introduced to forming an isolation material upon the surface of the molding plate. The main objective of forming the isolation layer is to apply a moderate adhesive force between the flexible substrate material and the molding plate.

After that, such as step S405, the coated flexible substrate material is preferably the flexible polyimide-based material. A pressing step is then optionally applied to compact the flexible substrate material onto the base structure formed of the isolation layer and the molding plate.

In step S407, a curing process is applied to the flexible substrate material.

In one of the embodiments of the present invention, the curing process may be implemented by a baking process. The baking process may include multiple stages of temperature, such as two, three or more stages with different temperatures baking. However, the curing process may not be limited to the described schemes, and the baking steps may be implemented as many type other than the multiple stages baking In an exemplary example, the two-stages baking includes a first-stage baking, in which an around one-hour backing step takes temperature approximately with 70 degree centigrade to 80 degree centigrade. After cooling down for a while, a second-stage baking with approximately 150 degree centigrade to 200 degree centigrade for around one hour is processed.

Furthermore, the three-stages baking process may also be incorporated. In which, the first-stage baking is approximately under 50 degree centigrade for around thirty minutes. The second-stage baking is approximately undergoing 170 degree centigrade through 250 degree centigrade for around thirty minutes. The third-stage baking is approximately undergoing 210 degree centigrade and takes about one hour. Those conditions for the described baking process may be modified as required.

The flexible substrate material through curing process has a certain level of rigidity and flexibility. Further, the cured flexible substrate material can be de-molded from the surface of the base structure made by the isolation layer and the molding plate (step S409). Therefore, a flexible substrate with specified surface structure is formed (step S411).

Figure 5:
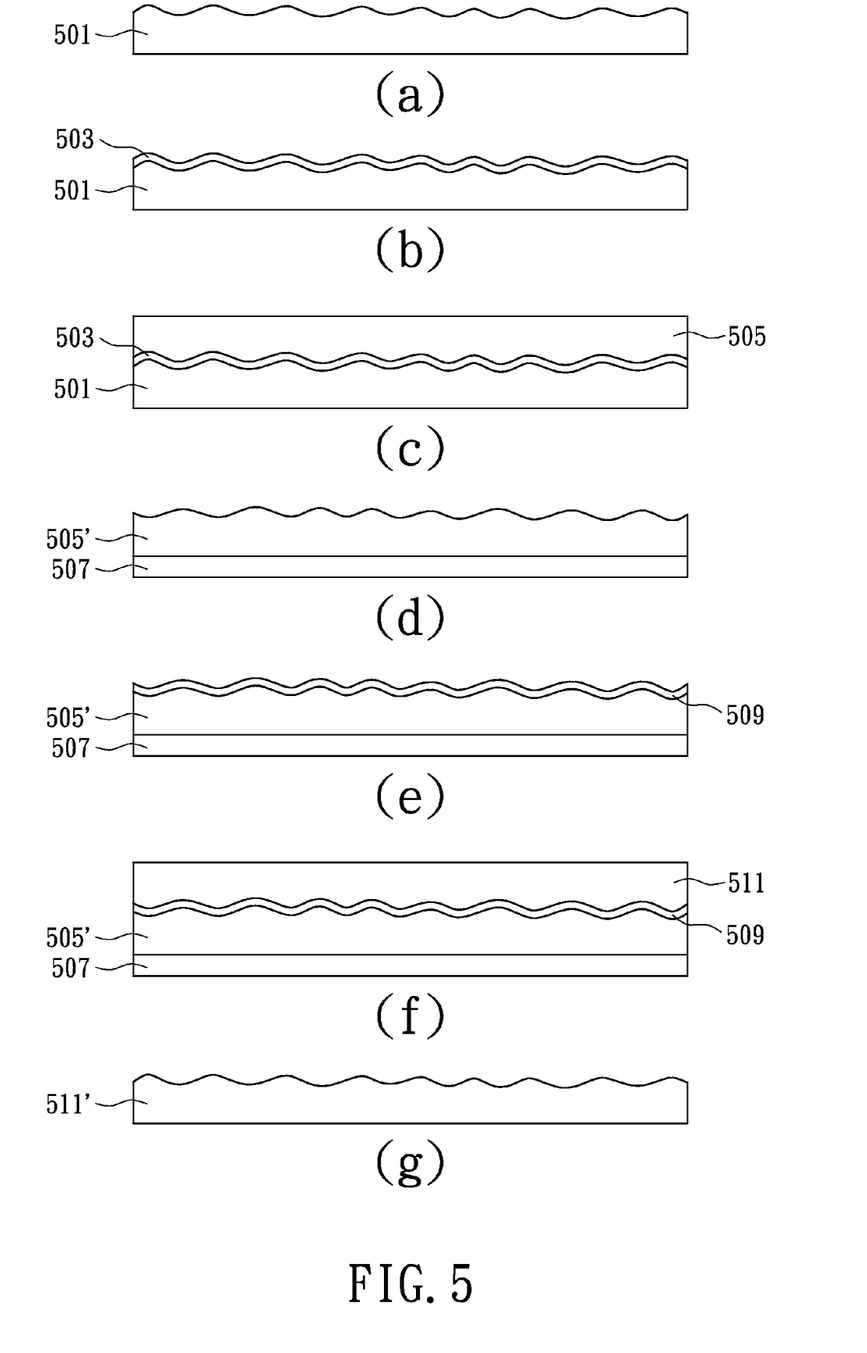
FIG. 5 (a)(b)(c)(d)(e)(f)(g) illustrates one of the embodiments of the manufacturing method for the flexible substrate with micro-structure in accordance with the present invention.

The diagrams shown in series of FIG. 5 (*a*)(*b*)(*c*)(*d*)(*e*)(*f*) (*g*) are related to the manufacturing process of the flexible substrate with surface structure in accordance with the embodiment of the invention.

FIG. 5(*a*) shows a molding plate 501 with the surface structure. The surface structure can be configured to meet the practical requirement. Next, such as FIG. 5(*b*), a first isolation material 503 is formed upon the molding plate 501 with a coating, depositing, or a plating process.

In FIG. 5(*c*), a first flexible substrate material 505 is coated onto the molding plate 501 and the first isolation material 503. A baking process is used to cure this first flexible substrate material 505. After a de-molding step, the first flexible substrate material 505 is transformed into a first flexible substrate 505' which has the surface structure complementary to the surface structure of the molding plate 501.

In particular for this exemplary example, such as FIG. 5(*d*), a hard substrate 507 is prepared. The first flexible substrate 505' specified with the surface structure is adhered to the hard substrate 507. The newly-formed structure shown in FIG. 5(*d*) is incorporated to be the base for manufacturing other flexible substrates.

Similarly, such as FIG. 5(*e*), a second isolation material 509 is formed through a coating, a depositing, or a plating process on the newly-formed base structure. The material characteristic of the second isolation material 509 shall be in consideration of the use of the first flexible substrate 505'. In this optimized process, the materials can be properly combined as required.

Next, such as FIG. 5(*f*), a second flexible substrate material 511 is coated onto the second isolation material 509. If it is necessary, a pressing step may be employed to compact the second flexible substrate material 511. Then a second flexible substrate product 511' is formed after a curing process and a de-molding process, such as FIG. 5(*g*). In particular, the second flexible substrate 511' having the surface structure is newly formed after the transfer process. The surface structure of second flexible substrate product 511' is therefore complementary to the surface structure of the first flexible substrate 505', namely identical to the surface structure of the firstly prepared molding plate 501.

Before the transfer process, the second flexible substrate product 511' shown in FIG. 5(*f*) may also be cured by a baking process. Particularly, multiple stages baking with different temperatures are preferably incorporated into this baking process. In the case of two stages baking, a first-stage baking is approximately undergoing 70 degree centigrade through 80 degree centigrade for around one-hour. The related second-stage baking is around undergoing 150 to 200 degree centigrade for around one-hour. The baking process can be flexibly modified as required.

Furthermore, in the above-described step shown in FIG. 5(*f*), a pressing process is optionally adopted after the second flexible substrate material 511 is coated onto the base structure. One of the objectives of the pressing process is to compact the structure fabricated of the second flexible substrate material 511, the second isolation material 509, and the first flexible substrate 505' onto the hard substrate 507.

During the one more transfer process, the second isolation material 509 is a silicide-based material, such as the silicon oxide or silicon nitride. The second flexible substrate material 511 is a polyimide-based material, including the organic polyimide or a mixture of the organic polyimide and the inorganic material.

The molding plate may be the material based on the silicon oxide rather than the mentioned molding plate which requires the coating, depositing, or plating process to form the isolation layer thereon. The silicide molding plate is such as glass or the like, and is suitable to perform the de-molding to the material formed on the plate without the isolation layer. The related embodiment may be referred to the manufacturing process for the flexible substrate described in FIG. 6(*a*)(*b*)(*c*) (*d*).

It is different from the description of FIG. 1. The present embodiment does not require the isolation layer since the molding plate is primarily based on silicide material. In FIG. 6(*a*), the molding plate 601 with surface structure is firstly prepared. The material of the molding plate 601 is preferably based on silicide which serves a moderate adhesive force. The surface structure of the molding plate 601 is configured in accordance with the requirement. The design is also applicable to the single or multiple transfer processes.

FIG. 6(*b*) shows the step of coating the flexible substrate material 603 onto the molding plate 601. The flexible substrate material 603 is also the polyimide-based material.

A curing process is selectively applied on the flexible substrate material 603. Refer to the description of FIG. 1, the curing method includes a baking process. After curing the flexible substrate material 603, the end flexible substrate product 603' may have a certain level of rigidity and flexibility.

As shown in FIG. 6(*c*), the flexible substrate product 603' can be de-molded from the molding plate 601. The surface structure of flexible substrate product 603' is complementary to the surface structure of the original molding plate 601, such as the diagram shown in FIG. 1(*d*).

Next, the flexible substrate product 603' may also be the base structure for forming one more flexible substrate which has another complementary surface structure.

Rather than the conventional complex manufacturing processes for making the flexible substrate, the flexible substrate with surface structure in accordance with the present invention is made by the described low-cost manufacturing method properly for making the large-area mass production.

Figure 7:
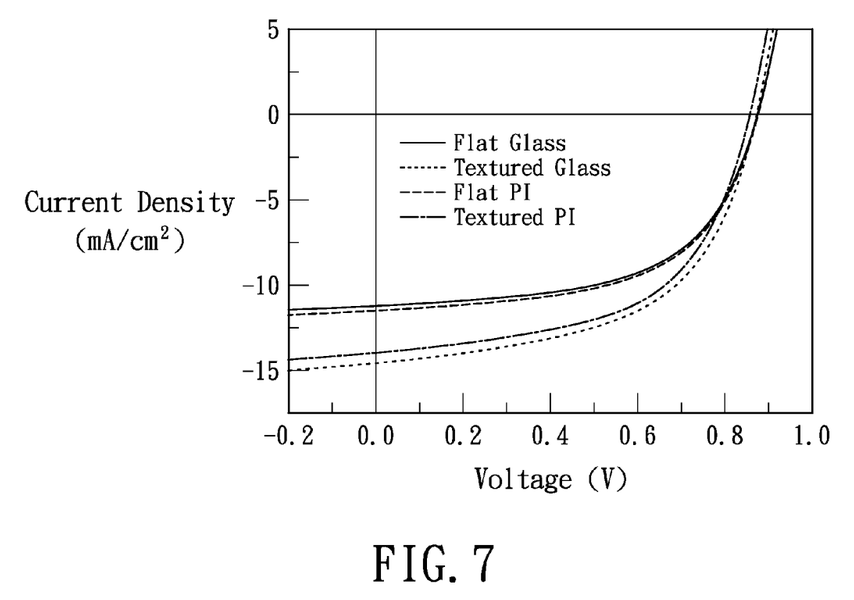
FIG. 7 is a data chart describing the electrical properties of various substrates adapted to the solar cell.

The relevant experimental data showing the electric properties of several types of substrates used for solar cell is exemplary described in FIG. 7. According to the comparison of several substrates used for the solar cell, it is apparent that the flexible substrate made by the manufacturing process in accordance with the present invention has no obvious difference from the substrate using the conventional method. That means the flexible substrate with the claimed method still reserves the concerned electric properties. In other words, the data shown in FIG. 7 prove that the flexible substrate in accordance with the present invention is capable to provide high optical absorptivity of the solar cell.

The composition of the mentioned flexible substrate material adopted in the transfer process may be referred to the hybrid composition for film fabrication disclosed in U.S. Patent Pub. No. 2008/0161473, published on Jul. 3, 2008. The material is based on the uniformly mixed silicon oxide and polyimide. This type of material is featured to exhibit the high transparency, high thermal-resistance, and low coefficient of thermal expansion. The material is especially used for make the flexible display substrate, and also adapted to the flexible substrate with the surface structure in the instant disclosure.

The horizontal axis of FIG. 7 describes the change of voltage (V). The vertical axis shows the change of current density ($mA/cm^2$) depending on the change of voltage. The curves represent the efficiencies of the solar cells different on substrates, including flat glass, textured glass, flat polyimide (PI), and textured PI.

The figure also shows the textured glass and the claimed textured polyimide provide better current density (negative value) as the voltage change is below 0.8 volt. That means the flexible substrate with surface structure made by the manufacturing method of the present invention does not loss its electric property.

Figure 8:
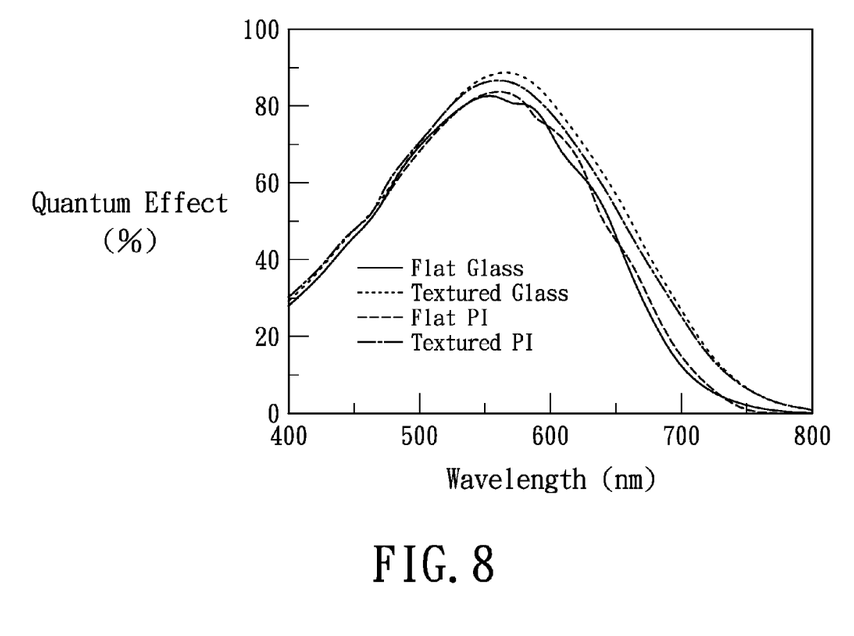
FIG. 8 is a data chart describing the external quantum efficiency of the various substrates adapted to the solar cell.

FIG. 8 is a data chart describing the External Quantum Efficiency (EQE) of the various substrates adapted to the solar cell.

The data describe the external quantum efficiency of solar cells using different substrates under various light sources with different wavelengths. The horizontal axis of the chart represents the optical wavelength (nm). The vertical axis of the chart shows the external quantum efficiency (%) of the substrate. The higher external quantum efficiency implies the higher optical absorptivity, and therefore the higher efficiency of solar cell.

The curves in the chart exhibit the external quantum efficiency of flat glass, textured glass, flat polyimide, and the textured polyimide. It is noted that the quantum efficiency may not have apparent difference if the light wavelength is within 500 nm to 600 nm. Within the range of this light wavelength, the flexible substrate with surface structure in accordance with the present invention does not loss quantum efficiency. The quantum efficiency of the claimed flexible substrate within the range of 600 nm to 700 nm is even better than the flat substrate.

The data shown in the chart proves that the flexible substrate with surface structure or with a certain scale of size made by the claimed method really enhance the light absorptivity of the solar cell, and also provide high-efficiency solar cell.

To sum up the above description, the flexible substrate in accordance with the present invention is particularly made by a low-cost manufacturing method which is applicable to large-area mass production. Further, the molding plate with surface structure is reusable and able to apply to other similar manufacturing process rather than to repeat the complicated steps. The end product of the manufacturing method is also adapted to the flexible substrate for the solar cell. The design of surface structure of the substrate serves the solar cell to improve the absorptivity of solar energy. Furthermore, the manufacturing method is also applicable to the low-cost and large-area mass production. Not only the low-cost manufacturing process is allowed to preserve the efficiency of solar cell, but also to keep the electric properties of relevant electrical components.

It is intended that the specification and depicted embodiment be considered exemplary only, with a true scope and spirit of the invention being indicated by the broad meaning of the following claims.

What is claimed is:

1. A method for manufacturing a flexible substrate with surface structure, comprising:
   preparing a molding plate with surface structure;
   forming an isolation material on surface of the molding plate for forming an isolation layer;
   coating a flexible substrate material on the isolation layer over the molding plate;
   curing the flexible substrate material;
   de-molding the cured flexible substrate material; and
   forming the flexible substrate with surface structure.

2. The method of claim 1, wherein the molding plate is substantially made of silicon oxide.

3. The method of claim 1, wherein the isolation material is substantially made of silicide.

4. The method of claim 3, wherein a depositing process is introduced to forming the isolation material on the surface of the molding plate with surface structure.

5. The method of claim 1, wherein the flexible substrate material is substantially made of polyimide.

6. The method of claim 1, wherein the flexible substrate material is made of mixture substantially of organic polyimide and inorganic silicon oxide.

7. The method of claim 1, wherein the step of curing is a baking process.

8. The method of claim 7, wherein the baking step includes:
   a first-stage baking under a temperature range of approximately 70 degree centigrade to 80 degree centigrade; and
   a second-stage baking under a temperature range of approximately 150 degree centigrade to 200 degree centigrade.

9. The method of claim 8, wherein the first-stage or the second-stage baking process takes about one hour.

10. The method of claim 7, wherein the baking step includes:
    a first-stage baking under a temperature of approximately 50 degree centigrade for around thirty minutes;
    a second-stage baking under a temperature range of approximately 170 degree centigrade to 250 degree centigrade for around thirty minutes; and
    a third-stage baking under a temperature of approximately 210 degree centigrade for around one hour.

11. The method of claim 1, further comprising a pressing step for compacting the flexible substrate material, the isolation material, and the molding plate with surface structure after the step of coating the flexible substrate material.

12. The method of claim 1, further comprising:
adhering the formed flexible substrate with surface structure to a hard substrate;
forming a second isolation material on surface of the flexible substrate with surface structure;
coating a second flexible substrate material on the second isolation material;
curing the second flexible substrate material;
de-molding the cured second flexible substrate material; and
forming a second flexible substrate with surface structure.

13. The method of claim 12, wherein the second isolation material is substantially made of silicide.

14. The method of claim 12, wherein the second flexible substrate material is substantially made of polyimide, or mixture of organic polyimide and inorganic silicon oxide.

15. The method of claim 12, wherein the curing step is a baking process comprising:
a first-stage baking under a temperature range of approximately 70 degree centigrade to 80 degree centigrade; and
a second-stage baking under a temperature range of approximately 150 degree centigrade to 200 degree centigrade.

16. The method of claim 12, wherein the curing is a baking process comprising:
a first-stage baking under a temperature of approximately 50 degree centigrade for around thirty minutes;
a second-stage baking under a temperature range of approximately 170 degree centigrade to 250 degree centigrade for around thirty minutes; and
a third-stage baking under a temperature of approximately 210 degree centigrade for around one hour.

17. The method of claim 12, further comprising a pressing step for compacting the second flexible substrate material, the second isolation material, the flexible substrate with surface structure, and the hard substrate adhered to the flexible substrate after coating the second flexible substrate material.

* * * * *